US012691634B2

(12) United States Patent
Odom et al.

(10) Patent No.: US 12,691,634 B2
(45) Date of Patent: Jul. 28, 2026

(54) SYSTEMS AND METHODS FOR ADDITIVE MANUFACTURING USING THERMALLY CROSS-LINKABLE MATERIALS

(71) Applicant: The Texas A&M University System, College Station, TX (US)

(72) Inventors: Morgan G. B. Odom, Bryan, TX (US); Micah J. Green, College Station, TX (US); Charles B. Sweeney, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/346,923

(22) PCT Filed: Nov. 10, 2017

(86) PCT No.: PCT/US2017/061093
§ 371 (c)(1),
(2) Date: May 2, 2019

(87) PCT Pub. No.: WO2018/089785
PCT Pub. Date: May 17, 2018

(65) Prior Publication Data
US 2020/0180219 A1 Jun. 11, 2020

Related U.S. Application Data

(60) Provisional application No. 62/420,767, filed on Nov. 11, 2016.

(51) Int. Cl.
*B29C 64/264* (2017.01)
*B29C 64/165* (2017.01)
(Continued)

(52) U.S. Cl.
CPC .......... *B29C 64/165* (2017.08); *B29C 64/209* (2017.08); *B29C 64/227* (2017.08);
(Continued)

(58) Field of Classification Search
CPC .................................................. B29C 64/264
See application file for complete search history.

(56) References Cited

U.S. PATENT DOCUMENTS 5,134,569 A * 7/1992 Masters ................. B29C 35/08
700/182
5,710,413 A 1/1998 King et al.
(Continued)

FOREIGN PATENT DOCUMENTS

KR 20140001287 A * 1/2014
WO WO-2015130401 A2 * 9/2015 ........... B29C 64/264

OTHER PUBLICATIONS

Machine translation of KR 20140001287, retrieved from EPO database Nov. 4, 2024 (Year: 2024).*

*Primary Examiner* — Timothy Kennedy
(74) *Attorney, Agent, or Firm* — Jackson Walker LLP

(57) ABSTRACT

The invention relates to additive manufacturing systems and methods using thermally cross-linkable materials. The thermally cross-linkable material includes at least one thermally cross-linkable polymeric material and an amount of at least one electromagnetic energy susceptor therein. A system with at least one print head and an electromagnetic energy generator is provided to produce electromagnetic energy in the area of the thermally cross-linkable material after being dispensed from the print head. This causes heating of the electromagnetic energy susceptor to cause curing of the thermally cross-linkable material.

10 Claims, 3 Drawing Sheets

(51) Int. Cl.

| | |
|---|---|
| *B29C 64/209* | (2017.01) |
| *B29C 64/227* | (2017.01) |
| *B33Y 70/10* | (2020.01) |
| *B82Y 40/00* | (2011.01) |
| *C01B 32/158* | (2017.01) |
| *B33Y 10/00* | (2015.01) |

(52) U.S. Cl.

CPC ............ *B29C 64/264* (2017.08); *B33Y 70/10* (2020.01); *B82Y 40/00* (2013.01); *C01B 32/158* (2017.08); *B33Y 10/00* (2014.12)

(56) References Cited

U.S. PATENT DOCUMENTS

| | | | | |
|---|---|---|---|---|
| 5,876,550 | A * | 3/1999 | Feygin | G05B 19/4099 264/405 |
| 6,543,890 | B1 | 4/2003 | Ylitalo et al. | |
| 2001/0002287 | A1 * | 5/2001 | Kar | B22F 12/41 427/205 |
| 2003/0083771 | A1 * | 5/2003 | Schmidt | B33Y 10/00 700/119 |
| 2006/0109327 | A1 | 5/2006 | Diamond et al. | |
| 2006/0119012 | A1 * | 6/2006 | Ruatta | B29C 64/153 264/497 |
| 2007/0241482 | A1 | 10/2007 | Giller et al. | |
| 2011/0013954 | A1 | 1/2011 | Domoto et al. | |
| 2015/0237681 | A1 | 8/2015 | Parsche | |
| 2015/0314532 | A1 * | 11/2015 | Gordon | B29C 64/209 425/174 |
| 2016/0200011 | A1 * | 7/2016 | Rothfuss | B29C 35/12 428/412 |
| 2017/0157845 | A1 * | 6/2017 | Bihari | B29C 64/393 |
| 2017/0334144 | A1 * | 11/2017 | Fish | B29C 64/153 |
| 2018/0265417 | A1 * | 9/2018 | Champion | B29C 64/165 |
| 2018/0272560 | A1 * | 9/2018 | Abbott, Jr. | B29C 64/165 |

* cited by examiner

SYSTEMS AND METHODS FOR ADDITIVE MANUFACTURING USING THERMALLY CROSS-LINKABLE MATERIALS

CROSS REFERENCE TO RELATED APPLICATION

This application is a national phase application of PCT International Application No. PCT/US17/61093, filed Nov. 10, 2017, which claims priority to and the benefit of U.S. Provisional Patent Application Ser. No. 62/420,767, filed on Nov. 11, 2016, which are incorporated herein by reference in their entirety.

FIELD OF THE INVENTION

The invention relates in part to systems and methods for additive manufacturing of products using thermally cross-linkable materials.

BACKGROUND OF THE INVENTION

There have been developed additive manufacturing (AM) techniques to manufacture a wide variety of products. In additive or three-dimensional fabrication techniques, construction of a three-dimensional object is performed in a layer-by-layer manner. An advantage of additive manufacturing techniques is the ability to create almost any shape or geometric feature. Examples of additive manufacturing techniques include material jetting or printing techniques, extrusion-based techniques, powder/binder jetting, directed energy deposition and other techniques. In general, a digital representation of the 3D part is initially sliced into multiple horizontal layers. For each sliced layer, a tool path is generated, which provides instructions for the particular additive manufacturing system to print the given layer. In some techniques, the formation of a layer is provided by the printing of and solidification of photo curable resins using visible or UV light irradiation. Although useful for some applications, such photo curable resins are expensive and may not provide desired mechanical, electrical or other desired properties. It would be desirable to utilize a material which has superior properties in the additive manufacturing of a wide variety of products. There is also a need for a method to make an object using 3D printing that has the same or better mechanical properties as compared to those of conventionally manufactured objects (such as those objects made by injection molding, extrusion molding, Vacuum Assisted Resin Transfer Molding, machining, etc.).

Thermally cured materials are polymeric materials including monomers, polymers or resins, generally in a soft solid or viscous state, that are processed using heat to cause cross-linking of the monomers, polymers or resins. For example, thermoset materials are formed into an infusible, insoluble polymer network through curing by the application of heat. Cross-linking forms bonds that link polymers to another to provide desired physical properties. Heat is used to cure such materials, but application of heat to a printed part may cause warping or other defects due to the long time needed for curing. It would be desirable to utilize thermally cross-linkable materials in the fabrication of a wide variety of products, and in an additive manufacturing process while avoiding these problems.

Other materials may be cross-linked to some degree using heat, such as some thermoplastic materials, thermoplastic elastomers and other materials. Such processing may include the application of heat for curing or partial curing, and use of such material in producing a product. It would be desirable to allow use of thermally cross-linkable materials in additive or other manufacture of products by exposure of the material to a predetermined, and substantially uniform amount of heat in the manufacturing process.

SUMMARY

In one aspect, the invention relates to additive manufacturing systems and methods for printing a three-dimensional part. In an example, the system comprises a printing system including at least one print head for printing layers of a three-dimensional part using a layer-based, additive manufacturing technique. A thermally cross-linkable material is introduced to the at least one print head, the material having at least one thermally cross-linkable polymeric material and an amount of at least one electromagnetic radiation susceptor material. An electromagnetic energy applicator to supply electromagnetic energy to the thermally cross-linkable material and at least one electromagnetic energy susceptor in the thermally cross-linkable material to cause heating of the at least one electromagnetic energy susceptor material and predetermined cross-linking of the at least one cross-linkable polymeric material.

In another example, the invention relates to a method for printing a three-dimensional part with an additive manufacturing system. The method comprises using at least one print head to dispense an uncured thermally cross-linkable material which includes at least one thermally cross-linkable polymeric material and an amount of at least one electromagnetic energy susceptor material. The dispensed material is exposed to a source of electromagnetic energy for a predetermined time to cause heating of the at least one electromagnetic energy susceptor material to at least partially cure the cross-linkable polymeric material.

In an example, relative movement between the at least one electromagnetic energy generator and the layer of thermally cross-linkable material dispensed by the at least one print head causes predetermined heating of the layer of dispensed material.

In another aspect of the invention, there is provided a system and method for curing polymeric materials. The system includes an enclosure into which a sample of a thermally cross-linkable material is provided. The thermally cross-linkable material includes at least one thermally cross-linkable polymeric material and an amount of at least one electromagnetic energy susceptor. An electromagnetic energy generator produces electromagnetic energy corresponding to at least one electromagnetic energy susceptor material in the thermally cross-linkable material to cause heating thereof. A movement system causes relative movement between the thermally cross-linkable material and the electromagnetic energy produced by the electromagnetic energy generator in at least one scanning direction, wherein the polymeric material is exposed to the electromagnetic energy in a manner to cause predetermined heating of the at least one electromagnetic energy susceptor material in the to cure the thermally cross-linkable polymeric material.

Other aspects of the invention will become apparent upon reading the following description in conjunction with the figures.

DETAILED DESCRIPTION OF THE INVENTION

Figure 1:
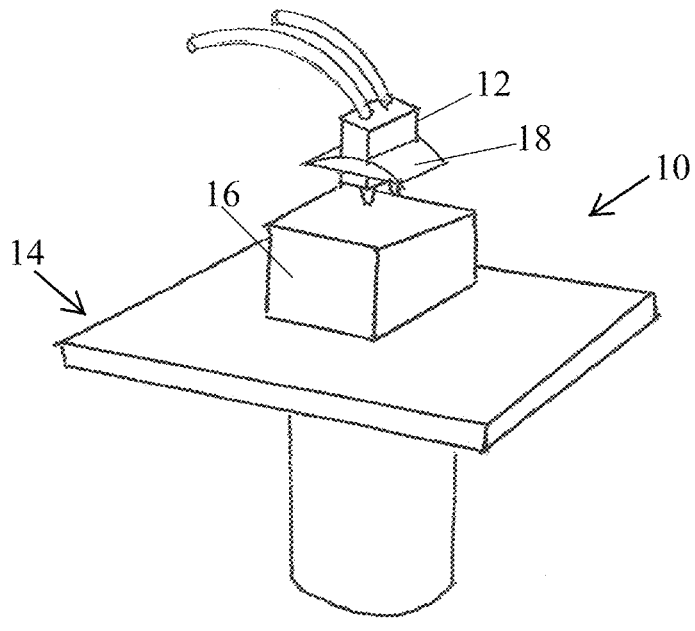
FIG. 1 is a schematic illustration of an additive manufacturing system according to an example of the invention.
Figure 2:
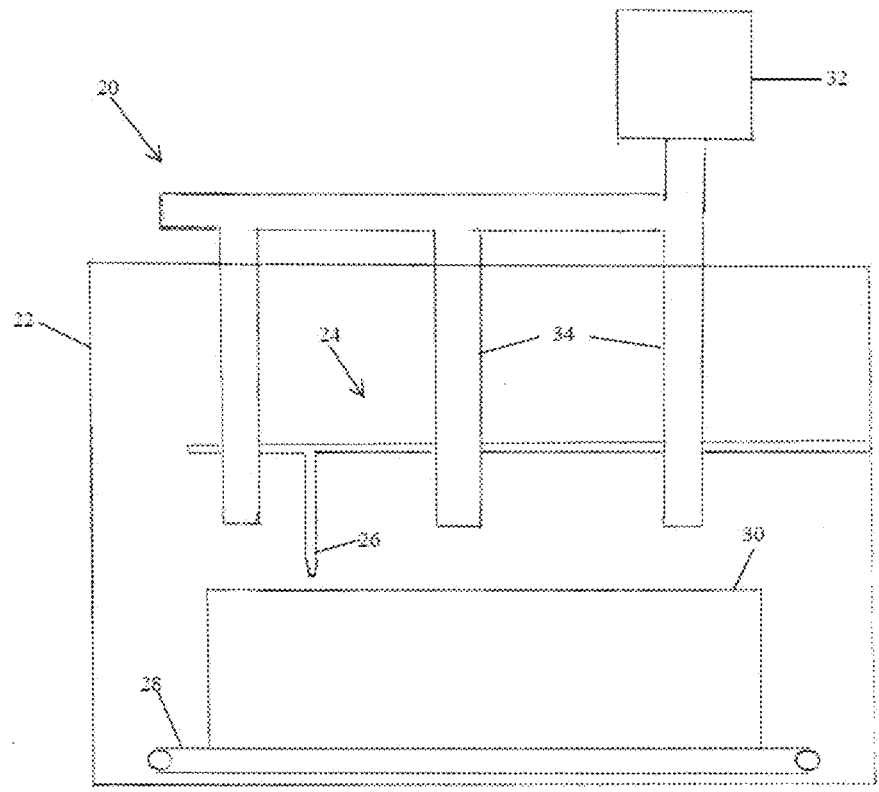
FIG. 2 is a schematic illustration showing another example of system according to the invention.

With reference to FIG. 1, the invention according to an example relates to an additive manufacturing apparatus that enables 3-D printing of a part using a thermally cross-linkable material. The thermally cross-linkable material comprises at least one thermally cross-linkable polymeric material, and an amount of at least one radio-frequency susceptor material dispersed therein.

In FIG. 1, a printing system 10 may include at least one print head 12, and a movable support system 14 to provide three axis motion for printing of a part 16. Associated with the at least one print head 12 is an electromagnetic radiation applicator 18. The printing system 10 may be provided with a thermally cross-linkable material to be extruded as a filamentary structure from a nozzle during 3D printing. The thermally cross-linkable material may be dispensed in a continuous filament including electromagnetic energy susceptor materials and possible other filler materials dispersed therein as will be described. An electromagnetic energy generator (not shown) produces RF energy of a predetermined frequency or range(s) of frequencies, in the region of the just-printed material by RF applicator 18. The RF energy may be selected to correspond to the at least one RF susceptor material included in the thermally cross-linkable material, to cause dielectric heating thereof. The applicator 18 may be any suitable arrangement to produce the desired RF energy in the region of the printed material, depending on the type and frequency or frequencies being produced. In an example, the applicator 18 moves with the print head 12, and produces a localized RF energy at the location of the just printed material. At least one print head 12 may include shielding to prevent exposure of the thermally cross-linkable material to the electromagnetic energy until after the material is dispensed from the print head. The produced electromagnetic radiation may be in any suitable portion of the electromagnetic spectrum, and produces predetermined heating of the RF susceptor material in the thermally cross-linkable material to cause curing of the material. The heat generation may be achieved in relation to the frequency or frequencies utilized, intensity of the electromagnetic energy, proximity to the source of the electromagnetic energy, the type of RF energy fields and the susceptor loading in the material or other parameters for example. These parameters may be optimized for a particular application or desired part. As an example, the susceptor loading may be in the range of 0.001-70 wt %. In addition, the thermally cross-linkable material may be loaded with reinforcing materials, such as carbon fiber or other suitable materials, to provide predetermined strength and physical characteristics in the cured material. The RF heating of the susceptor material heats the thermally cross-linkable material to a desired degree, to cause curing of the material. The radio frequency energy can be applied for a sufficient time to allow the susceptors to heat the surrounding thermally curable polymeric material through conduction. As examples, the frequency of the applied electromagnetic energy may be in a lower frequency range of 1-100 MHz, in the x-ray frequencies or any other suitable frequencies associated with a particular susceptor material.

In another example, a printing system 20 may include an enclosure 22 in which a part is produced according to the invention. Within the enclosure 22 is a 3D printing system 24 having at least one print head 26 which allows printing or deposition of the thermally cross-linkable material in a thin film in a specified pattern on a support surface 28, with repeated deposition of material layers to form a part 30. The support surface 28 may be a scanning gantry which allows movement of the part 30 as it is manufactured. Alternatively, the 3D printing system 24 may be moved relative to the support surface 28 by a suitable transport system. The relative 3D movement between the support 28 and printing system 24 allows deposition of the material in a desired 3D form of product 30.

The system 20 further includes at least one electromagnetic energy generator 32 which generates a predetermined electromagnetic field. For example, the electromagnetic energy generator 32 may be a RF generator to produce RF energy of a predetermined frequency or range of frequencies, strength or the like, corresponding to the at least one RF susceptor material included in the thermally cross-linkable material. Alternatively, the electromagnetic energy generator 32 could produce oscillating magnetic fields, with the at least one susceptor material being magnetic particles. Other suitable configurations of electromagnetic energy in combination with a susceptor material to cause heating of the susceptor material may be used. In an example, the electromagnetic energy susceptor material is in the form of nanoparticles, which are dispersed in the polymeric material to form a composite. The electromagnetic energy generated by electromagnetic generator 32 is applied to the dispensed material from each print head 26 by one or more applicators 34. As in the prior example, the applicator 34 may move with the print head 26, or electromagnetic energy may be generated in the regions of deposition from print heads 26 in any other suitable manner. The layer of dispensed material may be uniformly or non-uniformly exposed to the electromagnetic energy by relative movement between the dispensed material and the at least one applicator 34, or operation of the generator 32. Alternatively, the entire layer of dispensed material or portion thereof may be exposed to a uniform electromagnetic energy after deposition without this relative movement. If electromagnetic energy in the x-ray or other potentially harmful frequencies are used, the additive manufacturing system 20 can further include electromagnetic shielding to prevent emissions of electromagnetic energy from the system 20.

In an example, the dispensed material is a thermoset material, which is a multi-component system formed of at least one thermoset polymer resin and an amount of at least one RF susceptor material. The at least one RF susceptor material may be an amount of nanomaterials added into a thermally-curable resin system. The nanomaterials act as RF susceptors and heat up when exposed to RF fields generated by the electromagnetic energy generator 32. For example, an amount of carbon nanotubes (CNTs), may be used to serve as microwave susceptors to heat the thermoset material in a uniform manner. The carbon nanotubes may be single-walled (SWCNTs) or multi-walled (MWCNTs), functionalized carbon nanotubes, etc. Other forms of microwave absorbing nanomaterials can also be used, including carbon black, buckyballs, graphene, superparamagnetic or magnetic nanoparticles, metallic or semiconducting nanowires and quantum dots, graphitized or pyrolyzed polymers, and certain conductive polymers, such as polyaniline (PANT) or poly3,4-ethylenedioxythiophene polystyrenesulfonate (PE-DOT:PSS).

The exposure of the dispensed thermally cross-linkable material to predetermined RF energy in a predetermined manner provides for uniform and quick curing of the material after deposition, to allow successive layers to be added quickly. Although the thermally cross-linkable polymeric materials which may be used in the invention may be relatively insensitive to microwave energy, the carbon nanotubes or other RF susceptors in the resin display sensitivity to RF energy exposure and these generate localized heating. For example, an amount of between 0.001 wt. % to 50 wt. % or more may be used depending on the application or type of susceptor used, or more preferably between 3 wt. % to 25 wt. % of susceptor material. Alternately or in addition, the at least one susceptor material may be particles or nanoparticles of stainless steel, molybdenum, silicon carbide, aluminum or other conductive materials, or any field-responsive nanomaterial. Combinations of susceptor materials may be used. The susceptor material is dispersed in the polymer resin, and allows precision heating of the polymeric material, such as for rapid curing in a substantially uniform manner as an example. As an alternative, the thermally cross-linkable material may be a thermoplastic type material with cross-linkable groups, and the precision heating of the dispensed material may be used to cause a predetermined amount of cross-linking of the polymers for partial curing, or allow softening thereof to then allow forming a product by molding or the like.

The relative movement of the dispensed material relative to the at least one applicator 34 exposes the layer of dispensed material to uniform heating. With a thermoset material, this results in desired curing quickly and efficiently, while enabling production of a product 30 having desired mechanical, electrical or other desired properties. The 3D printing system may be of any suitable configuration to achieve production of desired parts 30. The electromagnetic energy generator 32 may be of any suitable configuration. For example, the generator 32 may be a produce electromagnetic radiation with frequencies between 1.0 MHz and 300 GHz. For example, RF frequencies in the range of 1.0 to 100 MHz may be suitable for heating of the amount of at least one RF susceptor material. The amount of time the nanocomposites are exposed to the electromagnetic energy may be controlled by the movement system and/or generation of the electromagnetic energy. The additive manufacturing device 10 or 20 can be operable to expose the dispensed cross-linkable material to the RF energy for a predetermined amount of time. The heating behavior of the RF energy may be influenced by the sample geometry, the applied electromagnetic energy and the susceptor materials' dielectric properties, and the system may be configured to provide the desired heating behavior. Controlled dispersion of the susceptor material may be used to control heating behavior. Controlled generation of heat may allow for producing a predetermined amount of cross-linking in the polymer matrix for example, or to soften the material for forming thereof into a product configuration.

The heating temperature of the material may also be monitored to provide information for controlling the movement system and/or application of electromagnetic radiation. The amount and dispersion of the susceptor materials in the resin may also be used to control the heating characteristics. The additive manufacturing system 20 can further include electromagnetic shielding to prevent emission of electromagnetic radiation, such as microwaves, from the device. The electromagnetic energy generated by generator 32 of the additive manufacturing device 20 could also be provided at the location of the print head 26 to expose the dispensed layer to the electromagnetic energy immediately after it is dispensed. The electromagnetic radiation can be focused from the generator 32 to a position relative to the print head 26. The application of electromagnetic energy can be once or in successive applications. The irradiation can occur during the additive manufacturing process and/or after completion of the additive manufacturing process. In examples, the scanning procedure of the invention allows uniform curing of a susceptor-loaded thermoset (such as epoxy) in an additive manufacturing process. Since the epoxy did not require a constraining area, this method of scanning and using the RF susceptor materials for curing can provide higher quality part production and the desirable characteristics of the thermoset material. The scanning procedure could also be utilized to easily and quickly cure prepreg panel layups or other large parts industrially using the scanning system of the invention.

Figure 3:
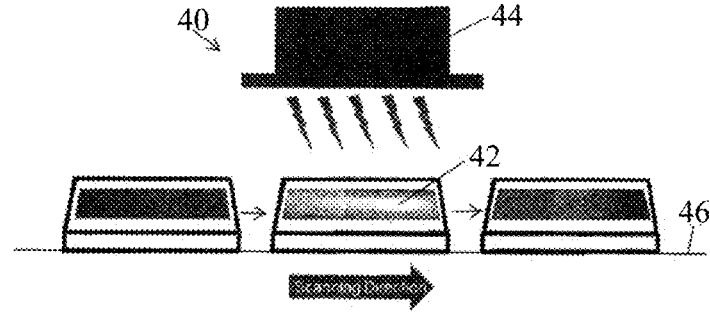
FIG. 3 is a schematic illustration showing another example of system according to the invention.

The invention can also be used in the context of manufacturing products from thermally cross-linkable polymeric materials in a mold or other suitable configuration. For example, large lightweight structural members may be produced using a thermally cross-linkable material, such as windmill blades, airplane fuselages, or a wide variety of other objects or products. For example, the invention allows quicker and more uniform curing of thermoset materials, which avoids problems with conventional curing techniques, such as caused by thermal gradients. In a further example with reference to FIG. 3, a system 40 may include an electromagnetic energy generator 44 and a support 46, on which a sample/product 42 of uncured, thermally cross-linkable material may be positioned. The generator 44 may be any suitable RF applicator producing RF energy in frequencies correlating to the type of electromagnetic energy susceptor that may be used. For various configurations, the generator 44 and/or the support 46 upon which the product 42 is positioned are movable relative to one another by a suitable movement system to allow scanning of the product 42 with the generated electromagnetic energy for heating of the susceptor material in the thermally cross-linkable polymeric material to cure the polymer material and form product 42. The heating of the polymeric material as it is scanned with the electromagnetic energy may be monitored to control heating as desired. For a thermoset material, the relative scanning of the product exposes the product to predetermined electromagnetic energy to produce substantially uniform heating of the thermally cross-linkable material as the electromagnetic energy is applied to the product 12. With a thermoset type of material, the ability to quickly cure the material in this manner greatly expands the materials available to manufacture products, and provide the mechanical and electrical performance characteristics desired, in a fast and cost-effective manner. Other types of multi-component thermally cross-linkable materials may be suitable, using similar or other nanomaterials as electromagnetic energy susceptors.

In an example system, a RF applicator directs the energy to area of deposition from a print head during relative movement of the print head, wherein the thermally cross-linkable material is exposed to the electromagnetic energy in a substantially uniform manner after deposition. With a thermoset material for example, the scanning technique is designed to ensure uniformity in curing of the thermoset.

The RF energy may be focused from a RF generator to the area adjacent the print head or surrounding the print head. Suitable electromagnetic energy may be used based on the type of thermally cross-linkable polymeric material, the type of the at least one susceptor material and application, along with other variables such as RF energy power, availability, penetration depth and the like. For a thermoset material for example, in order to achieve as uniform a cure of the material as possible, a scanning technique allows the sample of thermoset material to be pulled at a linear or variable rate relative to the RF applicator. This allows the entirety of the sample to be exposed to a predetermined RF energy. If the sample is of differing thickness or shape, the relative scanning movement between the sample and source of electromagnetic radiation may be varied to allow the entirety of the sample to be exposed to substantially the same RF energy and heating.

As mentioned as an example of thermally cross-linkable polymeric materials, thermally cured resins provide and maintain desirable physical and electrical properties, even in harsh environments such as high-temperature environments. Thermally cured compounds may comprise a resin system (with curing agents, hardeners, inhibitors, plasticisers) and fillers and/or reinforcement. The resin system is configured to provide desirable dimensional stability, heat and chemical resistance, and other characteristics. The fillers and additives can influence mechanical properties, such as dimensional stability, or may be used to confer specific properties, such as flame retardancy, ultraviolet (UV) stability or electrical conductivity. Thermally cured materials may include compounds such as epoxy, polyester, phenolic, vinyl ester, polyurethane, silicone, polyamide and polyamide-imide, or a variety of other compounds. For curing of such materials, the electromagnetic energy susceptor materials incorporated into such materials allow uniform heating to cause uniform curing of the material. The scanning exposure of such susceptor loaded resins to electromagnetic radiation to heat the susceptor material according to the invention avoids the long cure times and inhomogeneities such as may be created by thermal gradients. The invention is useful for curing of such materials, resulting in cross-linking of polymer chains or networks, brought about by exposure to heat. In thermoset materials, the molecular cross-linking process is irreversible. These materials therefore offer high thermal stability, good rigidity and hardness, and resistance to creep. Thermosetting resins are normally used in the liquid state and solidify and harden on curing. With some resins, it is possible to partially cure and then hold the resin in what is called the B-stage for the cure to be completed at a later time.

The invention may also be useful for processing of some types of thermoplastic elastomers, such as styrenic block copolymers (TPE-s), thermoplastic olefins (TPE-o), elastomeric alloys (TPE-v or TPV), thermoplastic polyurethanes (TPU), thermoplastic copolyester, thermoplastic polyamides or a variety of other materials. The invention may also be useful for processing of thermoplastic materials such as polyacrylics, acrylic, poly(methyl methacrylate) (PMMA), acrylonitrile butadiene styrene (ABS), thermoplastic polyamides, polylactic acid (polylactide), polybenzimidazole (PBI, short for poly-[2,2'-(m-phenylene)-5,5'-bisbenzimidazole]), polycarbonate (PC), polyether sulfone (PES), polyetherether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC), polytetrafluoroethylene (PTFE) or other thermoplastic materials.

Figures 4A, 4B:
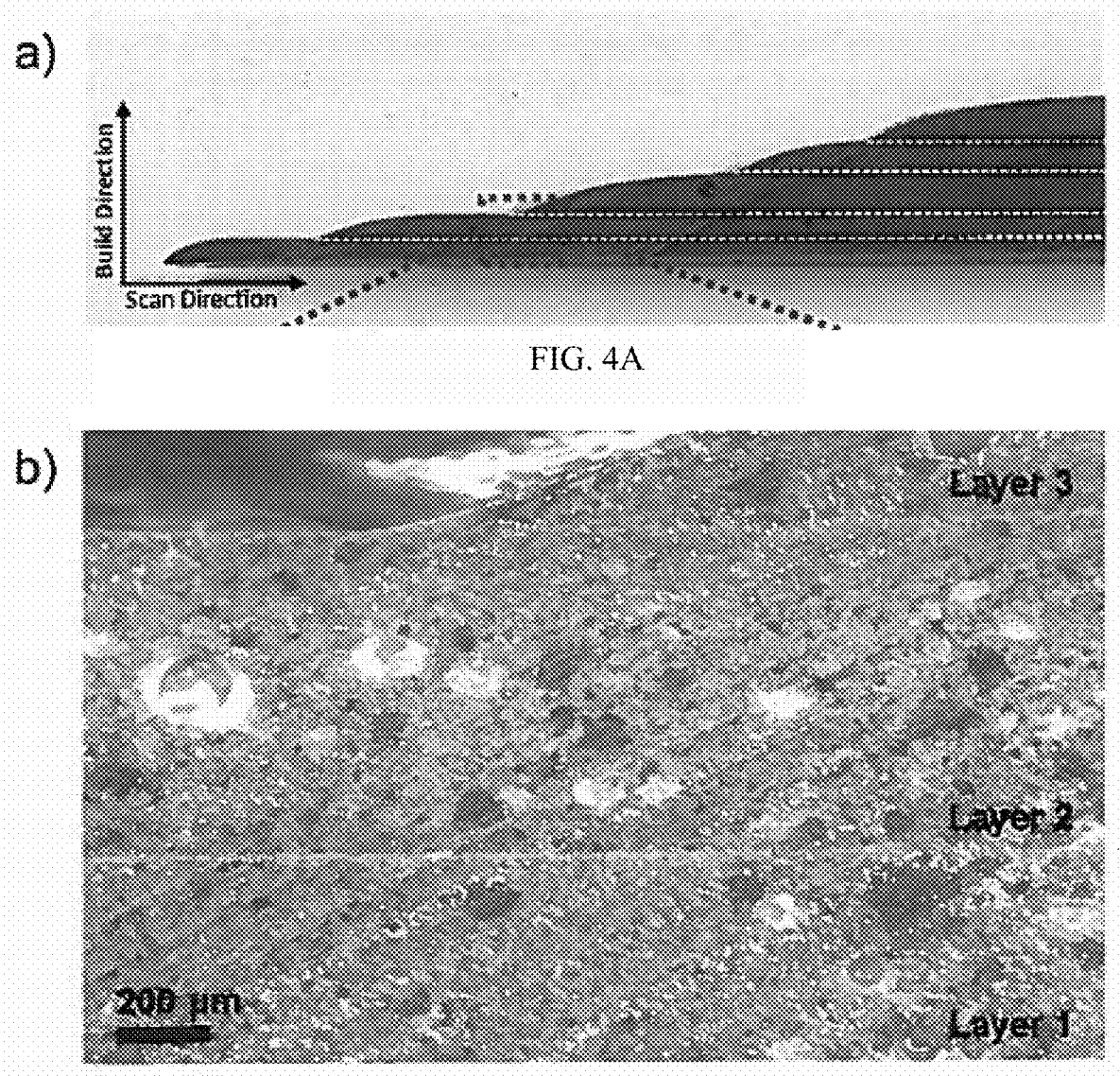
FIG. 4A shows a schematic depiction of a cross section of an additive manufactured sample manufactured according to an example of the invention.
FIG. 4B shows an optical microscope image of the cross section of an additive manufactured sample manufactured according to an example of the invention.

As an example relating to curing of a thermoset material in an additive manufacturing process according to the invention, a sample formed of a thermoset material according to an example was prepared by adding 5 wt. % MWCNT (OD 30-50 nm, Length 1020 pm, purity>95%, Cheaptubes) to a premeasured epoxy resin (System 2000, Fiberglast). The amount of RF susceptor material used in the thermoset composition may depend on the type of RF susceptor material and application. For example, an amount of between 0.001 wt. % MWCNT to 50 wt. % MWCNT, may be used depending on the application, or more preferably between 3 wt. % to 25 wt. % of this type of RF susceptor material. In this example, the added MWCNT was stirred thoroughly into the epoxy resin and the appropriate amount of hardener (2120, Fiberglast) was measured into the MWCNT/resin mixture and stirred thoroughly. In an example of additive manufacturing using the invention, 1 mm MWCNT-loaded epoxy (5 wt. %) was doctor-bladed onto a piece of Teflon and scanned at a linear rate of 0.08 cm/s under the RF applicator. As merely an example, the RF applicator is a microwave source (waveguide in the Faraday cage with the microwave setting at a power of 1250 W, in the set up shown in FIG. 3. As additional layers were added, the power was decreased to a lower power (750 W) for layers 2 and 3, a lower power (625 W) for layer 4 and finally a further lower power (500 W) for the final layer 5. The scanning process was repeated 5 times until a total thickness of approximately 4.6 mm was reached. A Forward-Looking Infrared (FUR) camera was used to monitor the temperature increase of each of the layers for evaluation. The resultant product is shown schematically in FIG. 4A and FIG. 4B shows an image of the cross section of the sample using an optical microscope. The cross-sectional image of the additive manufacturing sample was completed using an Olympus BX51 optical microscope at 5× under the blue fluorescence lighting mode. The formation of layers and step of causing heating of the dispensed material by exposure to electromagnetic energy to cause heating of RF susceptors causes welding of each layer to the other, and the welds can be seen under the blue fluorescent mode used to image the sample. RF susceptor heating using RF energy provides for better adhesion of the layers at the interfaces, or provides for the ability to tune the mobility of the polymeric material. The system allows control of the exposure to the electromagnetic energy and thus the heating of the polymeric material to achieve desired characteristics in the additive manufacturing context.

The following example relates to a sample of a thermoset material cured using the electromagnetic field-scanning technique of the invention, as compared to curing using an oven, and under a thermal gradient.

Thermoset samples according to the invention were prepared by adding 5 wt. % MWCNT (OD 30-50 nm, Length 1020 pm, purity>95%, Cheaptubes) to the premeasured epoxy resin (System 2000, Fiberglast). Scanning of a uniform shaped sample to cause curing is provided by movement of the sample at a constant speed (i.e. 0.16 cm/sec) underneath the RF applicator. The amount of and type of RF susceptor material used in the thermoset composition may depend on the type of product and application. For example, an amount of between 0.001 wt. % MWCNT to 50 wt. % MWCNT, may be used as a RF susceptor material depending on the application, or more preferably between 3 wt. % to 25 wt. % of this type of RF susceptor material. In this, example, the added MWCNT was stirred thoroughly and the appropriate amount of hardener (2120, Fiberglast) was measured into the MWCNT/resin mixture and stirred thoroughly. Though in an additive manufacturing process, no mold is necessarily used, some applications of the scanning technique of the invention may use a mold if desired. In the samples tested, 5 wt % MWCNT-loaded epoxy was used to ensure that the sample was above the percolation threshold.

In comparison to a neat epoxy sample without any electromagnetic energy susceptor, it was found that the presence of the MWCNTs markedly increases and prolongs the heating response. The MWCNT-loaded epoxy sample susceptibility stayed high (as compared to the neat sample) through the entire time the sample was exposed to the RF energy in the scanning technique, even after the sample had cured, but the susceptibility of the neat epoxy fell off as the epoxy began to cure. In a particular example, when the samples were removed from the RF applicator after a predetermined time, the MWCNT-loaded sample was fully cured but the neat sample was not, especially at the edges.

The invention has been described with reference to examples and confirmed by images of observed samples/specimens presented above. Only examples have been presented and described in detail, it is to be understood that the invention is not limited thereto or thereby. It is therefore intended that the invention not be limited to the particular embodiments disclosed as examples of invention, but that the instant invention will include all embodiments falling within the scope of the appended claims.

What is claimed is:

1. An additive manufacturing system for printing a three-dimensional part comprising:
   a printing system including at least one print head for printing a plurality of layers of a three-dimensional part using a layer-based, additive manufacturing technique;
   a movable support system with three axis motion on which the three-dimensional part is printed;
   a transport system that moves the printing system relative to the movable support system;
   at least one thermally cross-linkable material introduced to and dispensed from the at least one print head, having at least one thermally cross-linkable polymeric material and an amount of at least one electromagnetic energy susceptor material, wherein the at least one cross-linkable polymeric material is a thermoset material;
   an electromagnetic energy generator configured to apply electromagnetic energy to the at least one thermally cross-linkable material to heat the at least one electromagnetic energy susceptor material to cause predetermined cross-linking of the at least one cross-linkable polymeric material, wherein the electromagnetic energy generator is provided adjacent to the at least one print head and applies electromagnetic energy by a plurality of applicators to each layer of the plurality of layers dispensed from the printer head immediately after the layer is dispensed;
   wherein the electromagnetic energy generator is configured to apply electromagnetic energy simultaneously from the plurality of applicators to provide uniform curing across a width of each dispensed layer;
   wherein dispersion of the at least one energy susceptor is used to control heating of the at least one thermally cross-linkable material; and
   wherein the electromagnetic energy generator supplies a lower level of electromagnetic energy to each successive layer of the plurality of layers.

2. The system of claim 1, wherein the movable support system causes relative movement between the dispensed thermally cross-linkable material and the electromagnetic energy produced by the electromagnetic energy generator in at least one scanning direction.

3. The system of claim 1, wherein the at least one electromagnetic energy susceptor is an amount of nanoparticles.

4. The system of claim 1, wherein the at least one electromagnetic energy susceptor material is an amount of carbon nanotubes.

5. The system of claim 1 wherein the amount of the at least one electromagnetic energy susceptor material is in the range of 0.001 wt. % to 50 wt. %.

6. The system of claim 1, wherein the electromagnetic energy generator moves along a scanning gantry to irradiate the at least one thermally cross-linkable material just after being dispensed from the at least one print head.

7. The system of claim 1, wherein the at least one thermally cross-linkable material is substantially uniformly heated by the amount of at least one electromagnetic energy susceptor material.

8. The system of claim 1, wherein an amount of time the at least one electromagnetic energy susceptor is exposed to the electromagnetic energy may be controlled by movement of the dispensed at least one thermally cross-linkable material relative to the electromagnetic energy generator and/or controlling generation of the electromagnetic energy from the electromagnetic energy generator.

9. The system of claim 1, further comprising a temperature sensor, wherein the temperature sensor comprises a forward-looking infrared camera.

10. The system of claim 1, wherein the at least one electromagnetic energy susceptor material comprises molybdenum.

* * * * *